(12) United States Patent
Yamagami (10) Patent No.: US 7,152,078 B2
(45) Date of Patent: Dec. 19, 2006

(54) SYSTEMS, METHODS AND COMPUTER PROGRAM PRODUCTS FOR BACKUP AND RESTORING STORAGE VOLUMES IN A STORAGE AREA NETWORK

(75) Inventor: Kenji Yamagami, Los Gatos, CA (US)

(73) Assignee: Hitachi, Ltd., Tokyo (JP)

( * ) Notice: Subject to any disclaimer, the term of this patent is extended or adjusted under 35 U.S.C. 154(b) by 380 days.

(21) Appl. No.: 10/033,584

(22) Filed: Dec. 27, 2001

(65) Prior Publication Data

US 2003/0126107 A1 Jul. 3, 2003

(51) Int. Cl.
*G06F 17/30* (2006.01)

(52) U.S. Cl. .................. 707/204; 711/161; 711/162

(58) Field of Classification Search ........ 707/200–205; 711/161, 162; 714/6
See application file for complete search history.

(56) References Cited

U.S. PATENT DOCUMENTS

| | | | |
|---|---|---|---|
| 5,459,857 A | 10/1995 | Ludlam et al. | |
| 5,544,347 A | 8/1996 | Yanai et al. | |
| 5,572,659 A * | 11/1996 | Iwasa et al. | 714/6 |
| 5,594,900 A | 1/1997 | Cohn et al. | |
| 5,742,792 A | 4/1998 | Yanai et al. | |
| 5,799,141 A | 8/1998 | Galipeau et al. | |
| 5,812,748 A * | 9/1998 | Ohran et al. | 714/4 |
| 5,857,208 A | 1/1999 | Ofek | |
| 5,884,328 A | 3/1999 | Mosher, Jr. | |
| 5,889,935 A | 3/1999 | Ofek et al. | |
| 5,933,653 A | 8/1999 | Ofek | |
| 6,035,412 A * | 3/2000 | Tamer et al. | 714/6 |
| 6,044,444 A | 3/2000 | Ofek | |
| 6,163,856 A | 12/2000 | Dion et al. | |
| 6,173,377 B1 | 1/2001 | Yanai et al. | |
| 6,289,357 B1 | 9/2001 | Parker | |
| 6,308,284 B1 | 10/2001 | LeCrone | |
| 6,397,307 B1 * | 5/2002 | Ohran | 711/161 |
| 6,496,908 B1 * | 12/2002 | Kamvysselis et al. | 711/162 |
| 6,502,205 B1 * | 12/2002 | Yanai et al. | 714/7 |
| 6,505,216 B1 * | 1/2003 | Schutzman et al. | 707/204 |
| 6,581,143 B1 * | 6/2003 | Gagne et al. | 711/162 |
| 6,654,752 B1 * | 11/2003 | Ofek | 707/10 |
| 6,968,347 B1 * | 11/2005 | Gagne | 707/202 |
| 6,981,115 B1 * | 12/2005 | Yamagami et al. | 711/162 |
| 2001/0007102 A1 | 7/2001 | Gagne et al. | |
| 2002/0129203 A1 * | 9/2002 | Gagne et al. | 711/114 |

* cited by examiner

*Primary Examiner*—Debbie M. Le
(74) *Attorney, Agent, or Firm*—Sughrue Mion, PLLC; Pavel I. Pogodin, Esq.

(57) ABSTRACT

The present invention provides techniques for managing storage based replication. Specific embodiments provide techniques for performing system backup and restoring. In specific embodiments, benefits such as keeping a remote mirror between a primary volume and a secondary volume in operation can be provided. Since the remote mirror is usually used for disaster recovery purposes, where the mirrors must be always in-sync state, being able to take a backup without breaking the remote mirror can help provide a constant duplicate copy of production information in case of emergency, for example. Further, in some embodiments, a user can take backups of more than one generation by setting up two or more secondary volumes (SVOLs) for one primary volume (PVOL).

8 Claims, 6 Drawing Sheets

Overview of backup

Fig1. Overview of backup

Fig2. Overview of restoring

Fig 4 Flowchart for taking a backup

Fig5. Restoring individual files

Fig6. Restoring the whole volume

US 7,152,078 B2

SYSTEMS, METHODS AND COMPUTER PROGRAM PRODUCTS FOR BACKUP AND RESTORING STORAGE VOLUMES IN A STORAGE AREA NETWORK

BACKGROUND OF THE INVENTION

The present invention relates generally to techniques for storage replication, and in particular to techniques for remote storage replication.

Conventionally, there have been two types of approaches to storage-based replication, local and remote replication. Both technologies mirror files, filesystems, or volumes without using host CPU power. When a host writes data to a volume containing production data (PVOL), the storage system automatically copies the data to a replication volume (SVOL). This mechanism ensures that PVOL and SVOL are identical.

The local replication approaches duplicate volumes within one storage system, so that the PVOLs and SVOLs are in the same storage system. The local replication approaches are typically used for taking backups. When a user by manual means, or a backup program, splits a mirrored pair, data written from a host is no longer copied to the SVOL. Accordingly, the SVOL now contains a backup of PVOL. To restore the whole volume, the user can re-synchronize PVOL with SVOL. To restore individual files, the user can copy files from SVOL to PVOL through host.

The remote replication duplicates volumes across two or more storage systems. Data is transferred through paths, such as ESCON, Fibre Channel, T3, and/or IP networks, directly connecting two storage systems. The remote replication typically used to recover data from disasters, such as earthquake, flood, fire, and the like. Even if the storage system or the whole data center at the primary site is damaged by a disaster, data is still at the secondary site and businesses can be resumed quickly.

While certain advantages are perceived, opportunities for further improvement exist. For example, according to conventional replication approaches, issues can arise when restoring data. One way to restore data is to restore data from tape, send it through a network, and restore it to the desired location. This technique can take a long time, since two sites may be at a geographically distant, and the network may public, like internet, which has limited throughput. Also, if the network is public, security issues may arise.

What is needed are improved techniques for managing storage based replication.

SUMMARY OF THE INVENTION

The present invention provides techniques for managing storage based replication. Specific embodiments provide techniques for performing system backup and restoring. In specific embodiments, benefits such as keeping a remote mirror between a primary volume and a secondary volume in operation can be provided. Since the remote mirror is usually used for disaster recovery purposes, where the mirrors must be always in-sync state, being able to take a backup without breaking the remote mirror can help provide a constant duplicate copy of production information in case of emergency, for example. Further, in some embodiments, a user can take backups of more than one generation by setting up two or more secondary volumes (SVOLs) for one primary volume (PVOL).

In a representative embodiment, the present invention provides a method of backup and restore procedure. The method is especially useful in an environment in which a first storage subsystem and second storage subsystem are connected to each other via a path. The first storage subsystem is connected to a first host and the second storage subsystem is connected to a second host. The method comprises performing a backup procedure and a restore procedure. The backup procedure comprises providing a first logical volume to the first storage subsystem, a second logical volume and a third logical volume in the second storage subsystem. The second logical volume can be a copied logical volume of the first logical volume. The first and second logical volumes can be in sync state. The third logical volume can be a copied logical volume of the second logical volume. The second and third logical volumes can be in sync state. The method further includes splitting the second logical volume and the third logical volume. The method can be initiated responsive to a command from the first storage subsystem, or the like.

The restore procedure comprises mounting the third logical volume to the second host. Reading a file to be restored from the third volume, and writing the file to the second volume is also part of the method. Further, the restore procedure includes re-synchronizing the first volume with the second volume. In a specific embodiment, the restore procedure further comprises recovering a database onto the first volume, if a database application is can be run on the first host. In a select embodiment, re-synchronizing the first volume with the second volume also includes determining data on the second volume pending copy to the primary volume. The data pending copy can be tracked by a pending data bitmap, or other data structure, or tracking means. The method can also include, in some embodiments, marking write data arriving after the command in a pending data bitmap, thereby tracking which data has been modified. A restored volume produced according to the method described herein.

In a specific embodiment, the command comprises identities one or more files to be restored from the third volume and written to the second volume. The reading, at the second host, a file to be restored from the third volume and the writing, at the second host, the file to the second volume includes reading exclusively the files specified in the command from the third volume and writing the files so read to the second volume.

In a representative embodiment, the present invention provides a method, comprising receiving an indication of files to be restored. Determining whether the files to be restored comprise contents of an entire volume is also part of the method. If the files are an entire method, then splitting remote mirrors existing between the production volumes and backup volumes is performed. The method also includes resynchronizing local mirrors existing between the backup volumes and volumes holding data copied from the backup volumes and resynchronizing remote mirrors for the production volumes and the backup volumes. Resynchronizing can bring two volumes into a sync state, in which they are identical in content to one another, "forming a mirror," or "mirrored pair."

In a specific embodiment, resynchronizing local mirrors existing between the backup volumes and volumes holding data copied from the backup volumes comprises comparing a pending bitmap for the backup volume with a pending bitmap for the volume holding data copied from the backup volume to determine a set of differential data and copying the differential data from the volume holding data copied from the backup volume to the backup volume.

In a specific embodiment, resynchronizing remote mirrors for the production volumes and the backup volumes comprises comparing a pending bitmap for the production volume with a pending bitmap for the backup volume to determine a set of differential data and copying the differential data from the backup volume to the production volume.

In another representative embodiment, the present invention provides an apparatus. The apparatus comprises a means for receiving an indication of files to be restored. A means for determining whether the files to restore comprise contents of an entire volume is also part of the apparatus. The apparatus also includes a means for splitting remote mirrors existing between the production volumes and backup volumes. Means for resynchronizing local mirrors existing between the backup volumes and volumes holding data copied from the backup volumes; and means for resynchronizing remote mirrors for the production volumes and the backup volumes are also included in the apparatus.

In a further representative embodiment, the present invention provides a method of restoring a file. The file can be restored to a first storage subsystem connected to a first host from a second storage subsystem connected to a second host. The method can proceed in accordance with a request from the first host. The first storage subsystem and second storage subsystem are connected to each other via a path. The first storage subsystem stores a first logical volume, the second storage subsystem stores a second logical volume and a third logical volume. The second logical volume can be a copied logical volume of the first logical volume. The third logical volume can be a copied logical volume of the second logical volume. The first logical volume and the second logical volume can be in a non-sync state. The second and third logical volumes can be in sync state. The method comprises mounting the third logical volume to the second host. Reading, at the second host, a file to be restored from the third volume and writing, at the second host, the file to the second volume are also part of the method. The method further includes re-synchronizing the first volume with the second volume. In specific embodiments, mounting the third logical volume to the second host comprises responsive to a command, splitting the sync state between the second logical volume and the third logical volume. In a specific embodiment, a restored volume is produced according to the method described herein above.

In a yet further representative embodiment, the present invention provides a storage subsystem, comprising a first logical volume, a second logical volume, and an interface to a path providing connectivity to a primary storage subsystem. The second logical volume can be a copied logical volume of the first logical volume. The first logical volume is operative to be selectively placed into one of a sync state and a non-sync state with a logical volume in a primary storage subsystem. The first logical volume and second logical volume can be in sync state. The second logical volume is operative to permit host access to read files to be restored from the second logical volume and write the files to be restored to the first logical volume responsive to a restore command. The second storage subsystem is operative to establish a sync state between the first logical volume and the second logical volume.

In a still further representative embodiment, the present invention provides a computer program product. The computer program product comprises a computer readable storage medium that holds the codes. For example, code for receiving an indication of files to be restored can be part of the computer program product. The computer program product can also include code for determining whether the files to be restored comprise contents of an entire volume, and if so invoking a plurality of codes, such as code for splitting remote mirrors existing between the production volumes and backup volumes; code for resynchronizing local mirrors existing between the backup volumes and volumes holding data copied from the backup volumes; and code for resynchronizing remote mirrors for the production volumes and the backup volumes.

In a still further representative embodiment, the present invention provides an apparatus. The apparatus includes a means for receiving a command. Means for splitting a sync state existing between a second storage means and a third storage means is also part of the apparatus. The apparatus also includes means for making information on the third storage means available for reading. Further, the apparatus includes means for reading a file to be restored from the third storage means and a means for writing the file to the second storage means. Further, a means for re-synchronizing the second storage means with a first storage means is also part of the apparatus.

In a specific embodiment, the means for making information on the third storage means available for reading further comprises means for mounting the third storage means to a means for processing information stored by the third storage means.

In a yet still further representative embodiment, the present invention provides a computer program product. The program product comprises a computer program product that holds a variety of codes. Code for receiving a command is included in the computer program product. Code for splitting a sync state existing between a second storage unit and a third storage unit and code for making information on the third storage unit available for reading are also part of the computer program product. The product also includes code for reading a file to be restored from the third storage unit and code for writing the file to the second storage unit. Further the program product also includes code for re-synchronizing the second storage unit with a first storage unit.

In a yet further representative embodiment, the present invention provides a system, comprising a first storage subsystem connected to a first host and a second storage subsystem connected to a second host. The first storage subsystem and the second storage subsystem are connected to each other via a path. The first storage subsystem stores a first logical volume and the second storage subsystem stores a second logical volume and a third logical volume. The second logical volume can be a copied logical volume of the first logical volume. The third logical volume can be a copied logical volume of the second logical volume. The first logical volume and the second logical volume can be in a non-sync state. The second and third logical volumes can be in sync state. The second storage subsystem is operative to mount the third logical volume to the second host responsive to a restore command. The host is operative to read files to be restored from the third volume, and to write the files to be restored to the second volume. Further, the second storage subsystem is operative to establish a sync state between the first logical volume and the second logical volume. In some specific embodiments, the system further comprises a third storage subsystem. The third storage subsystem includes a fourth storage volume, which is at least sometimes in a sync state with a fifth volume of the second storage subsystem. The sync state enables data at the first storage subsystem and the third storage subsystem to be collected at the second storage subsystem.

Numerous benefits are achieved by way of the present invention over conventional techniques. Specific embodiments according to the present invention provide a number of advantages. For example, in some embodiments, one can restore only specified files, reducing the chances of accidental overwriting of files. Further, in select embodiments, restoring can be done using a private network for establishing connection between the storage systems. This provides for a connection that is secure, and high performance. Thus the restoring can be done quickly, and with much less possibility of data stolen, altered, and/or damaged. A benefit of backup and restoring using remote copy is that one can manage backup data at a single remote site. Using remote copy, data at several points of location can be collected at one site, and the collected data can be backed up there. This technique for performing system backup can have, in specific embodiments, benefits such as keeping a remote mirror in operation. The remote mirror is usually used for disaster recovery purpose, where the mirrors must be always in-sync state. If one breaks a remote mirror to take a backup, and disaster happens during this out-of-sync condition, then one cannot recover data at the present time. Further, in some embodiments, a user can take backups of more than one generation by setting up two or more secondary volumes (SVOLs) for one primary volume (PVOL) in some embodiments.

These and other benefits are described throughout the present specification. A further understanding of the nature and advantages of the invention herein may be realized by reference to the remaining portions of the specification and the attached drawings.

DESCRIPTION OF THE SPECIFIC EMBODIMENTS

The present invention provides techniques for managing storage based replication. Specific embodiments provide techniques for performing system backup and restoring. In specific embodiments, benefits such as keeping a remote mirror between a primary volume and a secondary volume in operation can be provided. Since the remote mirror is usually used for disaster recovery purposes, where the mirrors must be always in-sync state, being able to take a backup without breaking the remote mirror can help provide a constant duplicate copy of production information in case of emergency, for example. Further, in some embodiments, a user can take backups of more than one generation by setting up two or more secondary volumes (SVOLs) for one primary volume (PVOL).

Remote copy is becoming an increasingly popular way to establish highly available systems. Sometimes one wants to have a copy of a set of remote copy, which includes both PVOL and SVOL. Such copies are used for various different purposes from the original remote copy. For example, disaster recovery testing, decision support systems, and data warehousing are a few of the many example applications in which specific embodiments of the present invention may be used.

Remote mirroring technology, in which two remotely located disk systems are connected by remote links, and a mirror of the disks is kept, each of which is in the local or remote disk system are generally known. The reader is referred to U.S. Pat. Nos. 5,459,857; 5,544,347 and 5,933,653, for example for illustrative examples. However, these approaches lack many of the features and benefits that may be afforded by specific embodiments of the present invention as described herein.

System Configuration

Figure 1:
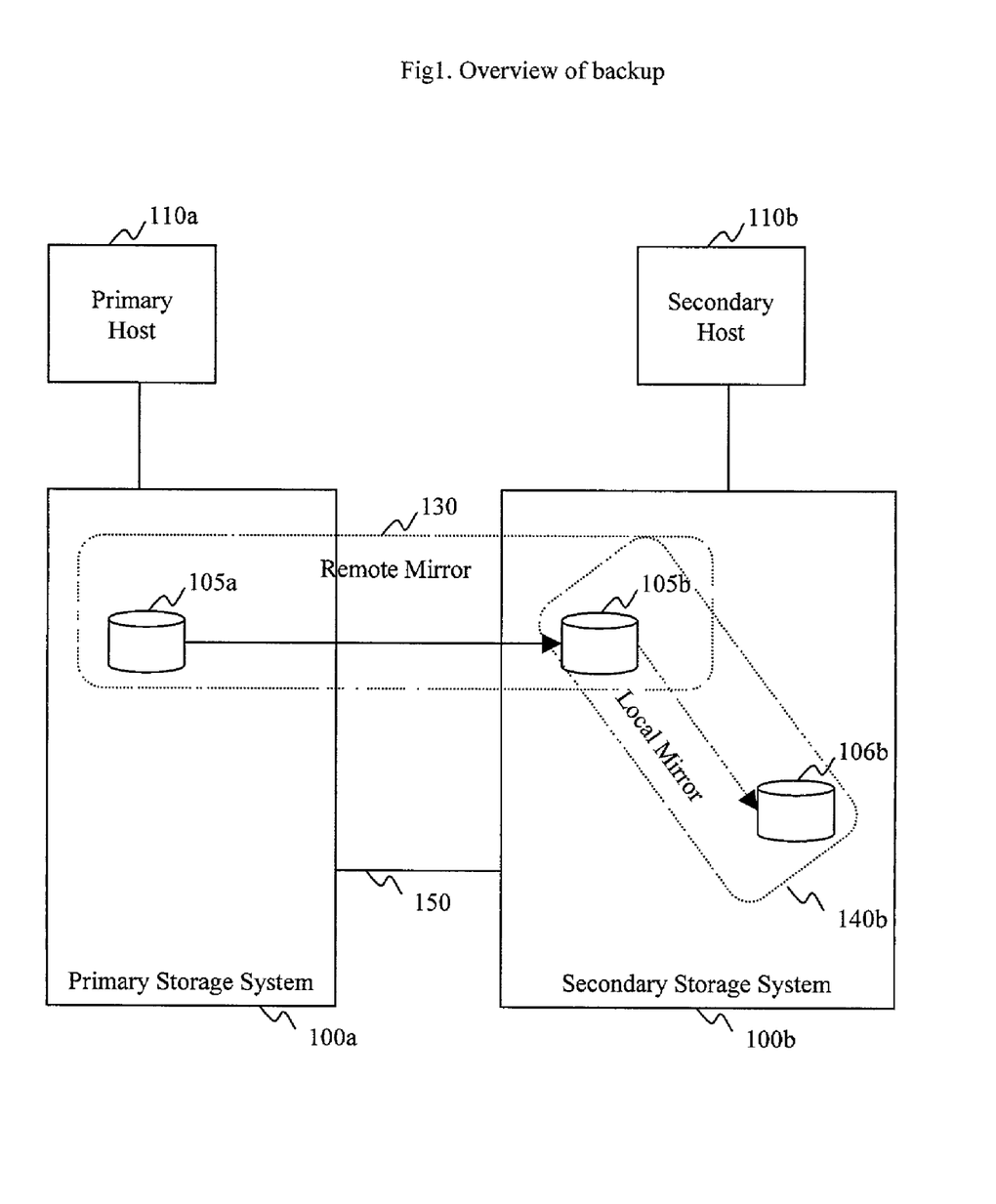
FIG. 1 illustrates a representative system configuration in a specific embodiment of the present invention.

FIG. 1 illustrates a representative system configuration in a specific embodiment of the present invention. In FIG. 1, a Production host 110a is a host computer on which applications run using production data. A Secondary host 110b serves as a "standby" for host 110a. In case of disaster, applications running on host 110a fail over to secondary host 110b.

A Primary storage system 100a comprises storage system that has volumes containing production data. Production host 110a connects to primary storage system 100a, so that the hosts can access volumes within the storage system. A Secondary storage system 100b comprises the storage system that has volumes containing copies of production data. Secondary host 110b connects to the secondary storage system 100b, so that the hosts can access volumes within the storage system.

A Remote mirror 130 comprises a set of volumes remotely mirrored. A remote mirror 130 contains a primary volume (PVOL) 105a, which is in the primary storage system 100a, and a secondary volume (SVOL) 105b, which is in the secondary storage system 100b. When the remote mirror is established, the primary volume 105a and the secondary volume 105b are in a sync state, such that the contents of these two volumes are identical unless the mirror is split manually or unexpectedly by a failure.

A Local mirror 140b comprises a set of volumes locally mirrored, i.e., within a single storage system. A local mirror 140b comprises a primary volume (PVOL) and a secondary volume (SVOL). For example, as illustrated by FIG. 1, volumes 105b and 106b are a primary volume (PVOL) and a secondary volume (SVOL), respectively for local mirror 140b. Both primary and secondary volumes of a local mirror 140b are in the same storage system 100b, while ones of a remote mirror 130 are in different storage systems 100a and 100b, respectively. Note that, in specific embodiments, a remote mirror 130 and a local mirror 140b may be used in conjunction with one another. In the example of FIG. 1, volume 105b is the secondary volume (SVOL) of remote mirror 130, as well as the primary volume (PVOL) of local mirror 140b. Accordingly, volume 105b is sometimes referred to as a Secondary and Primary Volume (SPVOL).

A Storage interconnect path 150 provides a connection between primary storage system 100a and secondary storage system 100b. Write data to volume 105a is sent though storage interconnection path 150, and written to remote copy secondary volume 105b. This mechanism keeps these two volumes identical.

In specific embodiments, backups are taken of information residing on the primary storage system to the secondary storage system, as illustrated by FIG. 1. Data on the primary storage system 100a is sent to the secondary storage system 100b by remote copy. The primary volume (PVOL) 105a and the secondary volume (SVOL) 105b of remote mirror 130 are kept identical (contains the same data) by operation of a remote mirror 130 existing there between. The data sent from the primary storage, system 100a is also copied to the secondary volume (SVOL) 106b, which is the secondary volume of the local mirror 140b residing within the secondary storage system 100b. This means that ordinarily, the three volumes, volume 105a, 105b, and 106b are identical. When a backup is taken, the local mirror 140b is split, under control of the host 110a or otherwise. The column 106b holds a point in time backup. This technique for performing system backup, can have in specific embodiments, benefits such as keeping remote mirror 130 in operation. The remote mirror 130 is usually used for disaster recovery purpose, where the mirrors must be always in-sync state. If one breaks a remote mirror to take a backup, and disaster happens during this out-of-sync condition, then one cannot recover data at the present time. Further, in some embodiments, a user can take backups of more than one generation by setting up two or more secondary volumes (SVOLs) for one primary volume (PVOL). For example, in FIG. 1, one can have more than one volume(s) 106b, for a single volume 105b in some embodiments.

Figure 2:
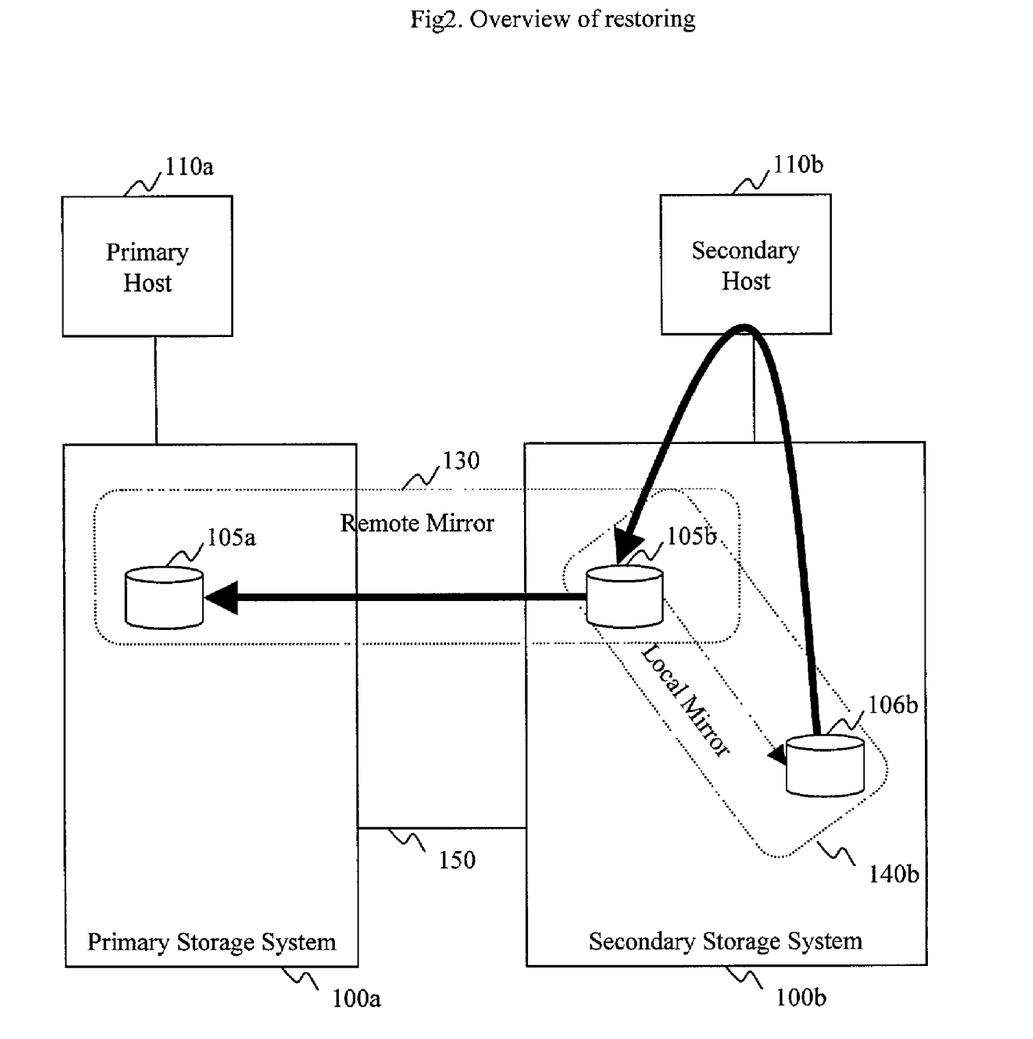
FIG. 2 illustrates a representative system in which a process for restoring files may be embodied in a specific embodiment of the present invention.

FIG. 2 illustrates a diagram of a restoring procedure in a specific embodiment of the present invention. As shown in FIG. 2, an example restoring procedure includes mounting secondary volume (SVOL) 106b to the host 10b, and copying files which one wants to restore from secondary volume (SVOL) 106b to secondary primary volume (SPVOL) 105b.

The primary volume (PVOL) 105a can be resynchronized with the secondary primary volume (SPVOL) 105b, which means that the files are copied from the secondary primary volume (SPVOL) 105b to the primary volume (PVOL) 105a. In specific embodiments of the present invention, storage system 100b has the delta bitmap, which keeps track of modified data after splitting a mirror. So the files, which were copied from secondary volume (SVOL) 106b to secondary primary volume (SPVOL) 105b, are marked on the bitmap so that only these files are copied to the primary volume (PVOL) 105a in storage system 100a.

Specific embodiments of the present invention can provide a number of advantages. For example, in some embodiments, one can restore only specified files, reducing the chances of accidental overwriting of files. Further, in select embodiments, restoring can be done using a private network for establishing connection 150 between the storage systems 100a and 100b. This provides for a connection that is secure, and high performance. Thus the restoring can be done quickly, and with much less possibility of data stolen, altered, and/or damaged.

Figure 3:
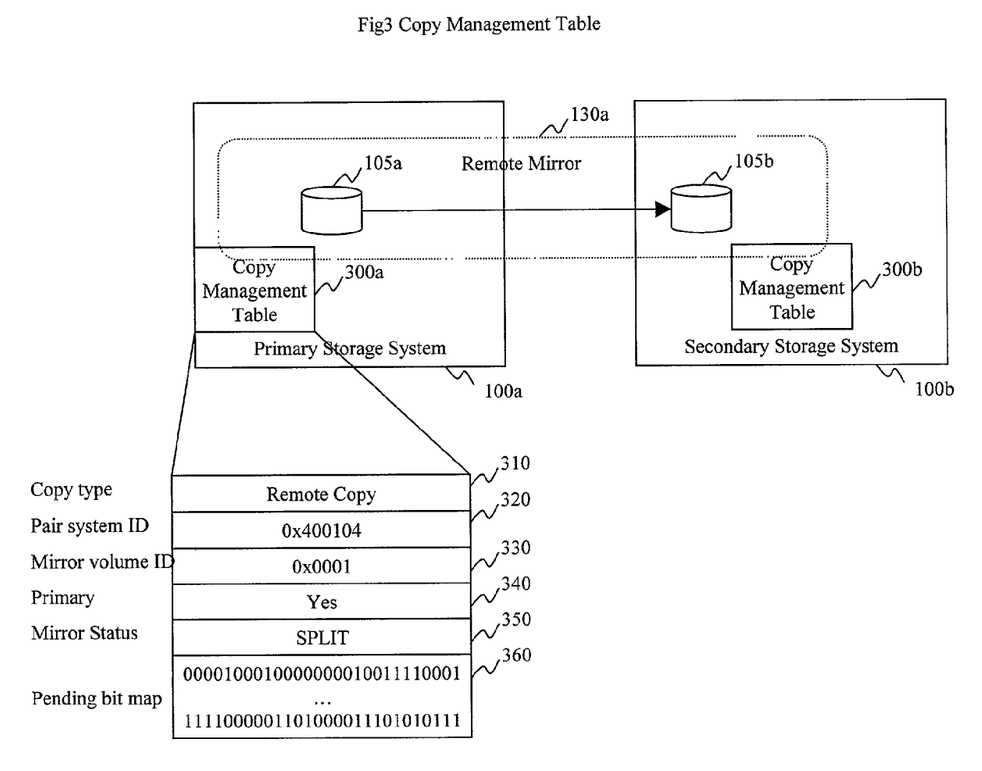
FIG. 3 illustrates a representative copy management table in a specific embodiment of the present invention.

FIG. 3 illustrates a representative copy management table in a specific embodiment of the present invention. In an example embodiment, both local and remote mirrored pairs comprise a copy of copy management table 300, as illustrated by FIG. 3, for each volume. Both primary volume (PVOL) and secondary volume (SVOL) of a mirrored pair have copy management table 300. For example in FIG. 1, volume 105a and 105b of remote mirror 130 have copy management table 300. Using this table, a storage system can break two local mirrors atomically in accordance with techniques of the present invention.

Copy management table 300 comprises a Copy Type 310 that stores either 'Remote Copy' or 'Local Copy', depending on the type of copy. A Pair System ID 320 contains the ID of the storage system that has the paired volume. For example, in the copy management table of volume 105a, a pair system ID 320 contains the ID of secondary storage system 100b. Note that each storage system has the unique ID, which can be the serial number of the storage system, or the like.

A Mirror Volume ID 330 contains the ID of the mirror volume. For example, in the copy management table of primary volume 105a, the mirror volume ID 330 contains the ID of secondary volume 105b. This ID may be the volume serial number within the storage system, or the like. A Primary 340 contains 'YES' if the volume is a primary volume (PVOL) or otherwise a 'NO' if not. For example, Primary 340 for volume 105a shows 'YES', while that of volume 105b shows 'No'.

A Mirror status 350 shows a status of the mirror. In a specific embodiment, four statuses are defined, including COPY, DUPLEX, SPLIT and SIMPLEX. Simplex status indicates that the volume is not mirrored. Copy status indicates that the volume is mirrored, and data copy is in progress. Duplex status indicates that the volume is mirrored, and two volumes are identical. A split status indicates that the volume is mirrored, but the mirror is temporarily suspended. In split status, all updates to the volume are recorded in the pending bitmap 360, so that only modified data is copied when re-synchronizing the mirror.

A Pending bitmap 360 shows if there is pending data that is written on the volume, but not on the paired volume. Each bit corresponds to a portion of a volume, e.g. 8K bytes, in one embodiment. When data is written to blocks on the volume during the split status, the bits in the pending bitmap 360 associated with the blocks are set.

Figure 4:
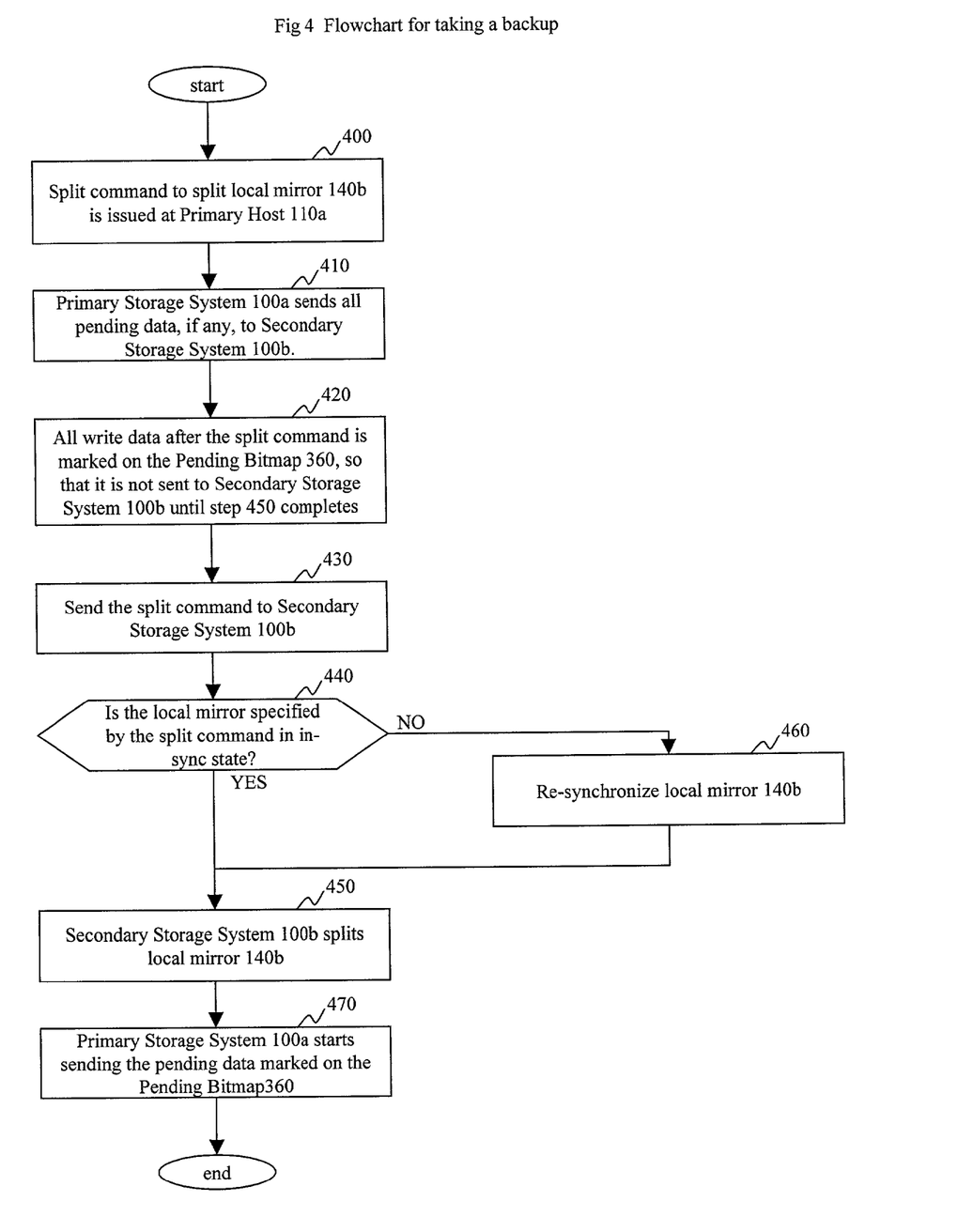
FIG. 4 illustrates a flowchart of a representative process for taking a backup in a specific embodiment of the present invention.

FIG. 4 illustrates a flowchart of a representative process for taking a backup in a specific embodiment of the present invention. As illustrated by FIG. 4, taking a backup comprises splitting local mirror 140b by issuing a split command from host 110a.

In a step 400, at primary host 110a, a split command is issued to split local mirror 140b.

In a step 410, primary storage system 100a sends all pending data, if any, to secondary storage system 100b. Such pending data may exist if the remote copy operates in asynchronous mode.

In a step 420, all write data from primary host 110a arriving at the primary storage system 100a after the split command is issued is not sent to the secondary storage system 100b. Accordingly, write data arriving after the split command is marked on pending bitmap 360, in order to keep track of which data has been modified. Such pending data is sent after all the split process is done.

In a step 430, primary storage system 100a sends the split command to the secondary storage system 100b.

In a step 440, the secondary storage system 100b checks if the local mirror 140b, specified by the split command, is in-sync. The secondary storage system 100b performs this check by referring to mirror status 350 in the Copy Management Table 300 associated with the mirror. If the mirror status 350 indicates "MIRROR", then the mirror is in-sync, otherwise, the mirror is out-of-sync.

In a step 460, if the local mirror 140b is out-of-sync, the secondary storage system 100b re-synchronizes volume 106b with volume 105b. All pending data is copied from volume 105b to volume 106b, bringing these two volumes back in-sync.

In a step 450, if the mirror is in-sync, or after step 460 has finished, secondary storage system 100b splits local mirror 140b. Now volume 105b contains the data at the point in time when the split command was issued at step 400.

In a step 470, after all the steps above are done, primary storage system 100a restarts sending data marked as pending on the pending bitmap 360 to secondary storage system 100b.

Figure 5:
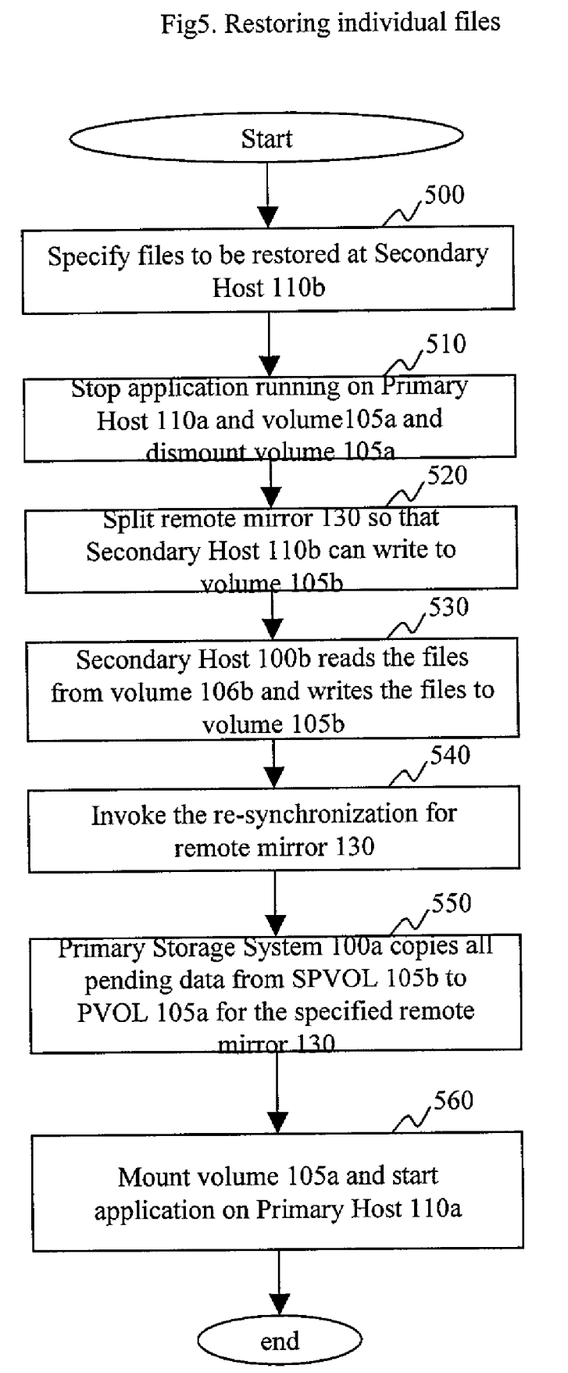
FIG. 5 illustrates a flowchart of a representative process for restoring files in a specific embodiment of the present invention.

FIG. 5 illustrates a flowchart of a representative process for restoring files in a specific embodiment of the present invention. As illustrated by FIG. 5 restoring files from a backup comprises a variety of steps:

In a step 500, at Secondary Host 100b, a restoring operation is invoked by specifying files to be restored.

In a step 510, applications that run on host 10a and use volume 105a are stopped. Then volume 105a is dismounted so that host 110a cannot write data to this volume.

In a step 520, a restoring program, running on host 100b, splits remote mirror 130 so that host 110b can write data to volume 105b.

In a step 530, the restoring program reads files from secondary volume (SVOL) 106b, and writes them to secondary primary volume (SPVOL) 105b. All write data after the split is performed has been marked on the pending bitmap 360 in the Copy Management Table 300 of volume 105b, as the data of the files. This pending bitmap 360 of volume 105b is for volume 105a. Also, the data of the files is exclusively write data after splitting.

In a step 540, the restoring program invokes a process to re-synchronize the primary volume (PVOL) 105a and the secondary primary volume (SPVOL) 105b of the remote mirror 130.

In a step 550, the Storage system 100a copies all pending data on the secondary primary volume (SPVOL) 105b to the primary volume (PVOL) 105a, according to pending bitmap 360.

The Storage system 100a first reads the pending bitmap 360 of secondary primary volume (SPVOL) 105b from storage system 100b. Then, the storage system 100a looks at two pending bitmaps 360 of primary volume (PVOL) 105a and secondary primary volume (SPVOL) 105b. The two bitmaps 360 contain differential data between the primary volume (PVOL) 105a and secondary primary volume (SPVOL) 105b. The storage system 100a then copies all the differential data from secondary primary volume (SPVOL) 105b to the primary volume (PVOL) 105a. Note that, only the files indicated above, i.e., the differential data, are copied to the primary volume (PVOL) 105a, thereby providing a means for restoring specific files.

In a step 560, the restoring has completed. Volume 105a is mounted and the application is restarted. If the application is a database, the database is recovered onto volume 105a.

Figure 6:
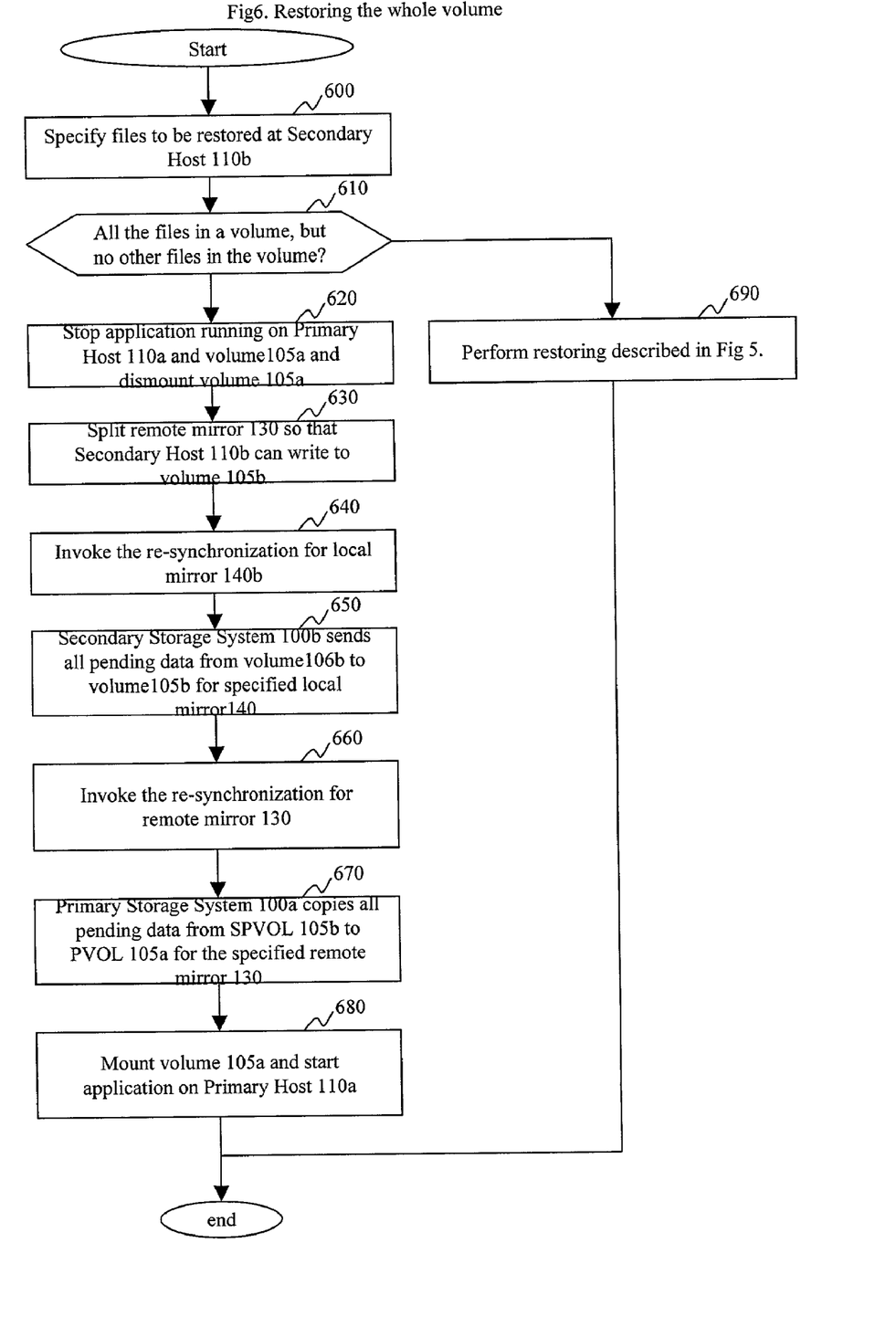
FIG. 6 illustrates a flowchart of a representative process for restoring a volume in a specific embodiment of the present invention.

FIG. 6 illustrates a flowchart of a representative process for restoring a volume in a specific embodiment of the present invention. If one needs to restore the whole volume, the process described in FIG. 5 is not necessary. Rather, volume 105b can be re-synchronized with 106b using techniques in accordance with the present invention. In a step 600, one invokes the restoring operation, by specifying files to be restored. This may be done by input of a command at secondary host 100b, or the like.

In a step 610, a restoring program, running on secondary host 100b, checks if specified files reside in a volume and the volume contains exclusively the specified files. If so, the whole volume can be restored.

In a step 620, applications that run on host 110a and use volume 105a are stopped. Then volume 105a is dismounted so that host 110a cannot write data to it.

In a step 630, the restoring program splits remote mirror 130 so that secondary primary volume (SPVOL) 105b can be written to.

In a step 640, the restoring program invokes processing to re-synchronize secondary primary volume (SPVOL) 105b with secondary volume (SVOL) 106b.

In a step 650, the storage system 100b copies all pending data on the secondary primary volume (SPVOL) 105b to secondary volume (SVOL) 106b, according to pending bitmap 360.

Secondary volume (SVOL) 106b has been split from secondary primary volume (SPVOL) 105b, while secondary primary volume (SPVOL) 105b keeps remote mirror 130 with primary volume (PVOL) 105a. Then secondary primary volume (SPVOL) 105b has write data from primary volume (PVOL) 105a. This means secondary primary volume (SPVOL) 105b has pending data to be written to secondary primary volume (SPVOL) 106b.

To re-synchronize secondary volume (SVOL) 106b with secondary primary volume (SPVOL) 105b, storage system 100b first looks at two pending bitmaps 360 of secondary volume (SVOL) 106b and of secondary primary volume (SPVOL) 105b. These bitmaps 360 indicate a differential of data between these two volumes. Storage system 100b copies all the differential data from secondary volume (SVOL) 106b to the secondary primary volume (SPVOL) 105b.

In a step 660, the restoring program then invokes a process to re-synchronize primary volume (PVOL) 105a with secondary primary volume (SPVOL) 105b.

In a step 670, the storage system 100b copies all pending data on secondary primary volume (SPVOL) 105b to the primary volume (PVOL) 105a for remote mirror 130.

After step 650, secondary primary volume (SPVOL) 105b has pending data for primary volume (PVOL) 105a, which is marked on pending bitmap 360. The primary volume (PVOL) 105a may also have pending data to secondary primary volume (SPVOL) 105b, since host 100a may have written data on primary volume (PVOL) 105a after splitting remote mirror 130 at step 630.

Storage system 100a first reads pending bitmap 360 of secondary primary volume (SPVOL) 105b from storage system 100b, and then looks at two pending bitmaps 360 of primary volume (PVOL) 105a and of secondary primary volume (SPVOL) 105b. The two bitmaps 360 contain differential data between primary volume (PVOL) 105a and secondary primary volume (SPVOL) 105b. Storage system 100a then copies all the differential data from secondary primary volume (SPVOL) 105b to primary volume (PVOL) 105a.

The preceding has been a description of the preferred embodiment of the invention. It will be appreciated that deviations and modifications can be made without departing from the scope of the invention, which is defined by the appended claims.

What is claimed is:

1. A method of backup and restore procedure using a first storage subsystem and second storage subsystem which are connected to each other via a path, the first storage subsystem connected to a first host, the second storage subsystem connected to a second host, the method comprising the steps of:

performing a backup procedure comprising the steps of:
provising a first logical volume in the first storage subsystem and a second logical volume and a third logical volume in the second storage subsystem, the second logical volume being a copied logical volume of the first logical volume, the first and second logical volumes being in sync state, the third logical volume being a copied logical volume of the second logical volume, the second and third logical volumes being in sync state; and
splitting the second logical volume and the third logical volume by a command sent by the first storage subsystem; and
performing a restore procedure comprising the steps of:
mounting the third logical volume to the second host,
receiving an indication of an individual file to be restored,
reading, at the second host, the file to be restored from the third volume,
writing, at the second host, the file to the second volume, and
re-synchronizing the first volume with the second volume.

2. The method of claim 1, wherein
performing a restore procedure further comprises:
recovering a database onto the first volume, if a database application is being run on the first host.

3. The method of claim 1, wherein
re-synchronizing the first volume with the second volume further comprises:
determining from a pending data bitmap data on the second volume to be copied to the primary volume.

4. The method of claim 1, further comprising
marking write data arriving after the command in a pending data bitmap, thereby tracking which data has been modified.

5. The method of claim 1, wherein
the command comprises identities of one or more files to be restored from the third volume and written to the second volume, and wherein
reading, at the second host, a file to be restored from the third volume and writing, at the second host, the file to the second volume,
further comprises:
reading exclusively the files specified in the command from the third volume and writing the files so read to the second volume.

6. A method of restoring a file to a first storage subsystem connected to a first host from a second storage subsystem connected to a second host, wherein:
the first storage subsystem and second storage subsystem are connected to each other via a path, the first storage subsystem stores a first logical volume, the second storage subsystem stores a second logical volume and a third logical volume, the second logical volume being a copied logical volume of the first logical volume, the third logical volume being a copied logical volume of the second logical volume, the first logical volume and the second logical volume being in a non-sync state, the second and third logical volumes being in sync state,
the method comprising:
mounting the third logical volume to the second host by a command sent by the first storage subsystem,
receiving indication of an individual file to be restored,
reading, at the second host, the file to be restored from the third volume and writing, at the second host, the file to the second volume, and
re-synchronizing the first volume with the second volume.

7. The method of claim 6, wherein:
mounting the third logical volume to the second host comprises:
responsive to the command from the first storage subsystem, splitting the sync state between the second logical volume and the third logical volume.

8. A system, comprising:
a first storage subsystem connected to a first host,
a second storage subsystem connected to a second host, wherein:
the first storage subsystem and the second storage subsystem are connected to each other via a path, the first storage subsystem stores a first logical volume, the second storage subsystem stores a second logical volume and a third logical volume, the second logical volume being a copied logical volume of the first logical volume, the third logical volume being a copied logical volume of the second logical volume, the first logical volume and the second logical volume being in a non-sync state, the second and third logical volumes being in sync state, the second and third logical volumes being operable to break the sync state in response to a command sent by the first storage subsystem,
the second storage subsystem operative to receive an indication of an individual file to be restored, mount the third logical volume to the second host responsive to a restore command, the host operative to read the file to be restored from the third volume and write the files to be restored to the second volume, and the second storage subsystem operative to establish a sync state between the first logical volume and the second logical volume.

* * * * *